Patented June 14, 1932

1,863,519

UNITED STATES PATENT OFFICE

ROSCOE H. CARTER, OF WASHINGTON, DISTRICT OF COLUMBIA

PROCESS FOR THE MANUFACTURE OF INSECTICIDES AND METHOD OF MAKING SAME

No Drawing.    Application filed November 15, 1929. Serial No. 407,552.

(GRANTED UNDER THE ACT OF MARCH 3, 1883, AS AMENDED APRIL 30, 1928; 370 O. G. 757)

This application is made under the act of March 3, 1883, amended April 30, 1928, and the invention herein described, if patented, may be manufactured and used by or for the Government for governmental purposes without payment to me of any royalty thereon.

I hereby dedicate the invention herein described to the free use of the public, to take effect upon the granting of a patent to me.

This invention relates to methods of making double fluorides of the alkali metals with aluminum; it comprises methods of making double fluorides and the products thereof, particularly the double fluorides of the alkali metals with aluminum, and being in the form of dried gels; wherein materials containing water soluble aluminum compounds, alkali metal compounds, and hydrofluoric acid (aqueous or gaseous) when brought together in the proper molecular proportions combine to form a gel which is then washed and dried; and it also comprises as a new composition of matter for insecticidal and other purposes dried gels containing double fluorides and also dried gels containing double fluorides and alumina all as more fully hereinafter set forth and as claimed.

Several of the fluorine compounds are useful insecticidal materials and are in use commercially for such purposes. However their use is limited to a considerable extent by their physical and chemical properties. Many are too insoluble to possess the proper toxicity to the insects against which they are employed while the more soluble ones cause foliage injury. The fluosilicates in particular have been investigated for their insecticidal value and have been found dangerous to foliage due to their water solubility and the acid reaction of their solutions. The physical condition of many of the common fluorine compounds also renders them unsuitable as insecticides because of their dense and crystalline form.

Since fluorine is available as hydrofluoric acid in considerable quantities I have invented a new and useful process for making compounds thereof which are useful as insecticides and possess advantages over methods and products now in use.

In my investigations I have found that when a water soluble salt of aluminum is treated with a water soluble alkali metal compound in the presence of water and hydrofluoric acid in the proper molecular proportions and heated they react to form the insoluble double fluorides of the metal with aluminum as a gelatinous colloidal precipitate which can be filtered off, washed and dried to a fine white powder. Considerable amounts of the double fluoride of potassium and aluminum or potassium hexafluoaluminate ($K_3AlF_6$) have been made in the laboratory by the following procedure.

Aluminum sulphate [$Al_2(SO_4)_3 \cdot 18H_2O$] (1000 g.) and potassium hydroxide (KOH) (1010 g.) were mixed in a small amount (8 liters) of water and hydrofluoric acid (HF) (750 g., 48% strength) added with stirring. Considerable heat was generated from the reactions and more heat was applied to bring the reaction mixture to boiling at which temperature it was maintained for 20 to 30 minutes. A gelatinous gel was formed which was filtered off, washed and dried to a fine white powder. Yields as high as 90 per cent of the theoretical amount of $K_3AlF_6$ were obtained and analyses agreed closely with the theoretical percentages of the different constituents. The molecular proportions of the components are illustrated by the equation

$$2K_3AlF_6 + 3K_2SO_4 + 24H_2O.$$

In this reaction there may be substituted other water soluble salts of aluminum (as for instance potassium or sodium alum, etc.) or other alkali metal compounds as, for instance, their carbonates, bicarbonates, oxides and peroxides, which give an alkaline reaction to their aqueous solution. The dried gel obtained as a final product in the case of the potassium hexafluoaluminate was a white powder relatively insoluble in water giving crystals of definite form upon evaporation of an aqueous solution and possessing definite insecticidal value. When properly made and purified by washing this compound is neutral or slightly alkaline in reaction to indicators. Almost any desired amount of hydrated alumina can also be precipitated as a gel along with the double fluoride by using the proper excess of the aluminum salt and the alkali. This results in a less dense product without materially affecting its insecticidal properties.

The amount of water used in these reactions is apparently not of any particular importance. I have found a convenient amount to be about 8 to 10 liters for 1,000 grams of aluminum sulphate and other reagents in the proper molecular proportions. The heat generated by mixing these chemicals is nearly sufficient to raise that amount of water to the boiling point so that not much more is required to complete the reaction. Time of heating also is not of considerable importance except that long continued digestion at high temperature tends to hydrolyze the double salt. Washing and filtration by any suitable means are carried out and drying was effected on the steam bath and then in an electric oven at 100 to 110° C. When properly made and dried the compound requires little grinding to reduce it to a powder.

I claim:

1. As new insecticidal preparations, the complex products of the reactions between aqueous solutions of one mole of aluminum sulphate, twelve moles of potassium hydroxide and less than twelve moles of hydrofluoric acid, such reaction products consisting principally of the water insoluble double fluorides of the alkali metals with aluminum, intimately and inseparably mixed with hydrated alumina.

2. As new insecticidal preparations, the complex products of the reactions between aqueous solutions of an aluminum salt, an alkali metal compound and hydrofluoric acid, the first two reactants being present in such concentrations as to furnish one combining weight of aluminum and six combining weights of the alkali metal, respectively, and hydrofluoric acid in a quantity insufficient to furnish enough fluorine to combine with all the aluminum, whereby alumina is precipitated in intimate mixture with the double fluoride of aluminum and alkali metal.

ROSCOE H. CARTER.